United States Patent
Le Roux et al.

(10) Patent No.: US 9,191,221 B2
(45) Date of Patent: Nov. 17, 2015

(54) TECHNIQUE FOR PROTECTING A POINT-TO-MULTIPOINT PRIMARY TREE IN A CONNECTED MODE COMMUNICATIONS NETWORK

(75) Inventors: Jean-Louis Le Roux, Lannion (FR); Mohamad Chaitou, Paris (FR)

(73) Assignee: Orange, Paris (FR)

(*) Notice: Subject to any disclaimer, the term of this patent is extended or adjusted under 35 U.S.C. 154(b) by 674 days.

(21) Appl. No.: 12/991,941

(22) PCT Filed: May 12, 2009

(86) PCT No.: PCT/FR2009/050862
§ 371 (c)(1),
(2), (4) Date: Nov. 10, 2010

(87) PCT Pub. No.: WO2009/153469
PCT Pub. Date: Dec. 23, 2009

(65) Prior Publication Data
US 2011/0069609 A1 Mar. 24, 2011

(30) Foreign Application Priority Data
May 23, 2008 (FR) ..................... 08 53374

(51) Int. Cl.
*H04L 12/26* (2006.01)
*H04L 12/18* (2006.01)
(Continued)

(52) U.S. Cl.
CPC ............ *H04L 12/1868* (2013.01); *H04L 45/28* (2013.01); *H04L 45/48* (2013.01); *H04L 45/50* (2013.01)

(58) Field of Classification Search
CPC ......... H04L 45/22; H04L 45/28; H04L 45/16; H04L 45/48
USPC ................... 370/219–228, 216; 709/239, 252
See application file for complete search history.

(56) References Cited

U.S. PATENT DOCUMENTS 7,663,632 B2 * 2/2010 Callway ................... 345/502
2003/0147344 A1 * 8/2003 Stewart et al. .............. 370/216
(Continued)

OTHER PUBLICATIONS

Katz et al., "Bidirectional Forwarding Detection; draft-ietf-bfd-base-08.txt," IETF Standard-Working-Draft, Internet Engineering Task Force, IETF, CH, pp. 1-48 (Mar. 1, 2008).
(Continued)

*Primary Examiner* — Andrew Chriss
*Assistant Examiner* — Romani Ohri
(74) *Attorney, Agent, or Firm* — Drinker Biddle & Reath LLP

(57) ABSTRACT

The invention relates to a technique for protecting a point-to-multipoint primary tree in a connected mode communications network set up from a primary root node to leaf nodes in the event of a fault affecting the primary root node by means of a back-up tree between a back-up root node and at least one merge node, said at least one merge node belonging to a branch of the primary tree coming from the primary root node. A merge node executes the following steps:
- a step of receiving a request to set up the back-up tree sent by the back-up root node including an identifier of the protected primary root node; and
- a step of configuring a routing rule in a table, the aim of said rule being to route packets coming from the back-up tree to branches of the primary tree coming from said merge node, said routing rule being activated only in the event of a fault affecting the primary root node.

12 Claims, 2 Drawing Sheets

(51) Int. Cl.
*H04L 12/703* (2013.01)
*H04L 12/753* (2013.01)
*H04L 12/723* (2013.01)

(56) References Cited

U.S. PATENT DOCUMENTS

| | | | |
|---|---|---|---|
| 2006/0126496 A1* | 6/2006 | Filsfils et al. | 370/216 |
| 2007/0019646 A1 | 1/2007 | Bryant et al. | |
| 2007/0047556 A1 | 3/2007 | Raahemi et al. | |
| 2007/0165515 A1* | 7/2007 | Vasseur | 370/216 |
| 2007/0174483 A1* | 7/2007 | Raj et al. | 709/238 |
| 2007/0177525 A1 | 8/2007 | Wijnands et al. | |
| 2007/0245034 A1* | 10/2007 | Retana et al. | 709/238 |
| 2007/0268899 A1 | 11/2007 | Cankaya | |
| 2008/0056258 A1* | 3/2008 | Sharma et al. | 370/390 |
| 2008/0123524 A1* | 5/2008 | Vasseur et al. | 370/228 |
| 2009/0070875 A1* | 3/2009 | Garg et al. | 726/23 |

OTHER PUBLICATIONS

Le Roux et al., P2MP MPLS-TE Fast Reroute with P2MP Bypass Tunnels; draft-ieft-mpls-p2mp-te-bypass-02.txt, Internet Draft, IETF, pp. 1-16 (Mar. 1, 2008).

Wei et al., "Head Node Protection Extensions to RSVP-TE for LSP Tunnels; draft-cao-mpls-te-p2mp-head-protection-01.txt," Internet Draft, IETF, pp. 1-18 (Nov. 17, 2007).

* cited by examiner

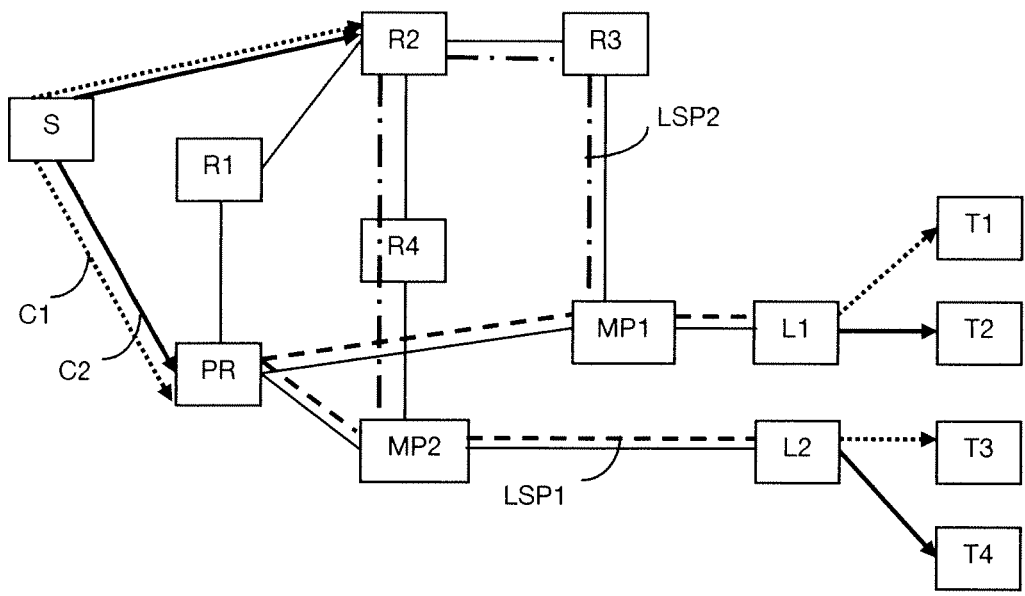
Fig. 1
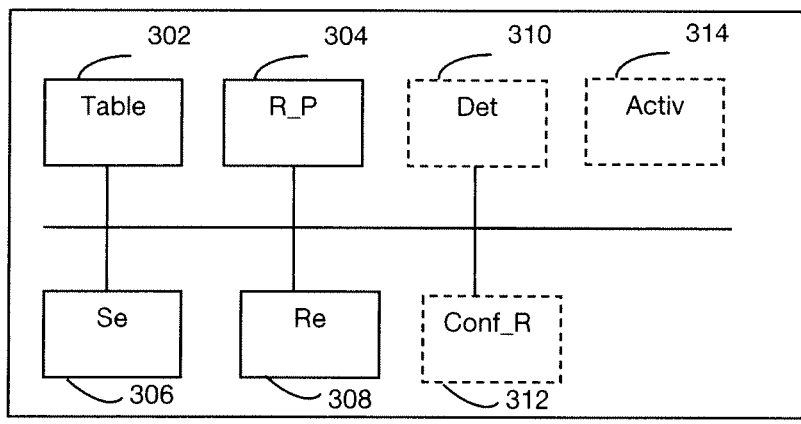
Fig. 2
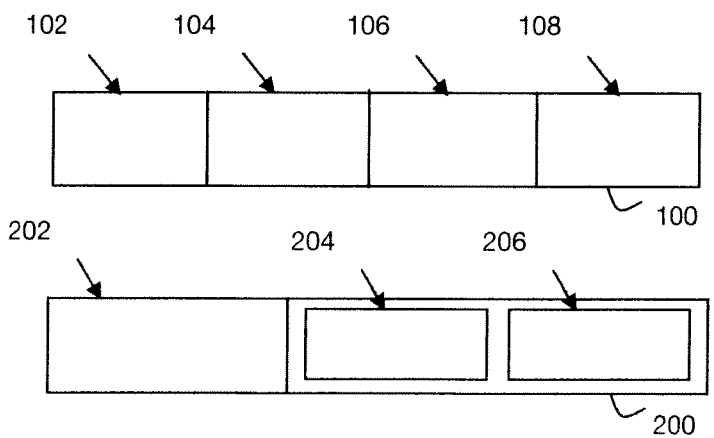
Fig. 4a
Fig. 4b

US 9,191,221 B2

TECHNIQUE FOR PROTECTING A POINT-TO-MULTIPOINT PRIMARY TREE IN A CONNECTED MODE COMMUNICATIONS NETWORK

CROSS-REFERENCE TO RELATED APPLICATIONS

This application is the U.S. national phase of the International Patent Application No. PCT/FR2009/050862 filed May 12, 2009, which claims the benefit of French Application No. 08 53374 filed May 23, 2008, the entire content of which is incorporated herein by reference.

FIELD OF THE INVENTION

The invention relates to a technique for use in a connected mode communications network to protect a primary tree set up from a primary root node to leaf nodes in the event of a fault affecting the primary root node.

This invention is in the field of communications networks and more particularly connected mode packet transport networks.

BACKGROUND

Transporting services such as Internet Protocol TeleVision (IPTV) requires traffic engineering mechanisms for optimizing the use of resources, guaranteeing a quality of service appropriate to the service, and minimizing service downtime in the event of a fault. The Point-to-Multipoint Multi-Protocol Label Switching Traffic Engineering (P2MP MPLS-TE) technology exists for this purpose. It makes it possible to set up a point-to-multipoint tree in a Multi-Protocol Label Switching (MPLS) communications network with reservation of resources. The associated protocol, specified in the Internet Engineering Task Force (IETF) document RFC 4875, is an extension of the resource reservation (RSVP-TE) protocol and makes it possible to set up MPLS trees called P2MP LSP in which packets are routed explicitly. These trees replicate traffic from a node called the root node to a set of nodes called the leaf nodes that are thereafter responsible for routing the traffic to receivers. Explicit P2MP RSVP-TE routing makes it possible to set up trees that minimize bandwidth consumption and also to reserve resources and thus to provide a guaranteed quality of service when routing packets.

To minimize the impact of a fault on a service and in particular the impact on the television pictures of an IPTV service, it must be possible to re-route packets in less than about fifty milliseconds. The IETF P2MP MPLS-TE Fast ReRoute (FRR) mechanism (see draft-ietf-mpls-p2mp-te-bypass-01) is based on local back-up trees bypassing the protected element; it therefore makes it possible to guarantee the above-mentioned level of security in the event of a fault on a P2MP LSP link or in a transit node.

In contrast, it does not enable fast rerouting of packets in the event of a fault in a root node.

Below, references to a fault affecting a root node refer either to a fault in the node itself or a fault on a link supporting a branch coming from it.

A mechanism for protecting the root node is proposed in the IETF document draft-cao-mpls-te-p2mp-head-protection-01.txt. In the event of a fault affecting its primary root, the protection of a P2MP LSP, called the primary tree, is based on a back-up tree set up from a back-up root. The broadcast traffic is sent by a broadcast source to both the primary root and the back-up root. This back-up tree has as leaves one or more nodes downstream of the primary root on the primary LSP. To be more precise, these connecting nodes, known as merge nodes, belong to the primary tree and are positioned immediately downstream of the primary root on the various branches of the primary tree coming from the root. Thus once the back-up tree has been set up, it is possible to re-inject traffic coming from the back-up tree into the branches of the primary tree situated downstream of the merge nodes. In nominal mode, only the primary tree is active, i.e. only the primary root injects traffic into the network: the back-up tree is set up but inactive, i.e. the back-up root destroys broadcast traffic received from the broadcast source. If the back-up root detects a fault affecting the primary root, it activates the back-up tree and routes the broadcast traffic in the back-up tree. Thus only one copy of the traffic reaches the leaf nodes, both under nominal conditions and during a fault.

However, in the event of a fault affecting the root, this protection mechanism is based on the back-up root detecting the primary root fault. The back-up root may be at a great distance from the primary root and it is then very difficult to ensure detection of the fault in less than about fifty milliseconds. This also applies when using a fault detection protocol such as the Bidirectional Forwarding Detection (BFD) protocol specified in the IETF document draft-ietf-bfd-base-07.txt.

It is also very difficult to synchronize the two roots. If the primary and back-up roots are far apart, it is possible for the back-up root to misdiagnose a primary root fault, for example if there is a problem on a link between both roots. In this situation the back-up root activates the back-up tree when the primary tree is still active. The receivers receive duplicated traffic coming from the two roots, which in an IPTV service is equivalent to a fault: for example, in a Moving Picture Experts Group (MPEG) television service, duplication leads to loss of picture. Thus some of the advantage linked to fast traffic rerouting is lost.

There is therefore a requirement for a technique making it possible to guarantee traffic rerouting within a time period compatible with services requiring a guaranteed quality of service and without duplicating traffic in the event of a fault of the root node of a point-to-multipoint label switching tree.

SUMMARY

The invention addresses this requirement by providing a method of protecting a point-to-multipoint primary tree in a connected mode communications network set up from a primary root node to leaf nodes in the event of a fault affecting the primary root node by means of a back-up tree between a back-up root node and at least one merge node, said at least one merge node belonging to a branch of the primary tree coming from the primary root node, said method including the following steps executed by said at least one merge node:

a step of receiving a request to set up the back-up tree sent by the back-up root node; and a step of configuring a routing rule in a table, the aim of said rule being to route packets coming from the back-up tree to branches of the primary tree coming from said merge node;

the method being characterized in that the set-up request includes an identifier of the protected primary root node and said routing rule is activated only in the event of a fault affecting the identified primary root node.

Thus the merge node concerned is configured to use the routing rule configured in the routing table on detection of a fault affecting the primary root node. The back-up tree may be a point-to-multipoint tree or a point-to-multipoint path, depending on the structure of the point-to-multipoint primary tree. In nominal mode, the merge node receives packets from both the primary tree and the back-up tree. As the back-up routing rule is not active, only packets coming from the primary tree are routed by the merge node. Through configuration, with the back-up tree connected to the primary tree at the merge nodes, it is possible to inject packets received from the back-up root node in the back-up tree into the primary tree once the back-up routing rule has been activated.

As the received request to set up the back-up tree contains a primary root node identifier, the merge node is able to activate surveillance of the primary root node or a link supporting a branch of the primary tree connecting the primary root node to the merge node. Given its position on the primary tree, it is even able to detect a fault affecting the primary root node in less than fifty milliseconds and makes it possible to obtain the required level of security.

In one implementation of the invention, the set-up request contains an identifier of the protected primary tree different from an identifier of the back-up tree.

As the back-up tree set-up request contains an identifier of the primary tree, it is therefore easier for an operator to distinguish a fault on a link or a node of the back-up tree from a fault on a link or a node of the primary tree. The identifier of the primary tree sent in the request is used in the step of configuring the routing rule in order to connect the back-up tree to the primary tree.

The protection method further includes a step of sending the primary root node a notification indicating that protection of the primary tree in the event of a fault affecting the root node is configured.

Thus the primary root node is informed of the activation of protection in the event of a fault affecting it, this protection being provided by the merge node that sent the notification.

The method further includes a step of detecting a fault affecting the primary root node and a step of activating said routing rule.

When it detects the fault affecting the primary root the merge node is able to activate the configured routing rule and thus to inject packets coming from the back-up root into the downstream branch or branches of the primary tree.

In a first implementation of the invention, the protection is activated both in the event of a fault in the primary root node and in the event of a fault affecting the link between the primary root node and the merge node.

In a second implementation of the invention, the protection is activated only in the event of a fault in the primary root node. Thus in the event of a fault affecting the link between the primary root node and the merge node, the primary root node is able to activate a fast reroute mechanism. The fast reroute protection mechanism and the protection mechanism of the invention can thus co-exist and thereby improve the overall level of protection.

In one implementation of the invention, the protection method further includes a step of notifying the back-up root node of the activation of protection.

Thus the back-up root node is informed of activation of protection by the merge node and in the event of a fault affecting the link between the primary root node and the merge node is able to inform the primary root node of the fault.

The protection method further includes a step of retaining the primary tree set up for each branch of the primary tree coming from the merge node.

Because of the fault, messages for retaining the primary tree already set up upstream of the merge node are no longer exchanged. To benefit from the protection, it is necessary to continue to send messages for maintaining the primary tree on the branch or branches of the primary tree downstream of the merge node, as when operating in nominal mode.

The protection method further includes:
  a step of receiving from the primary root node a restore request relating to the primary tree; and
  a step of activating another routing rule, the aim of said other rule being to route packets received on the primary tree to the branches of the primary tree coming from said merge node.

When the fault is over, it is necessary for the branch of the primary tree upstream of the merge node to be set up again identically in order to return to the nominal mode. This also makes it possible to return the routing table to its nominal configuration with the protection configured, i.e. with the back-up routing rule configured but not active. Note that returning to the nominal mode does not entail any interruption of service and does not require any coordination between the primary root node and the back-up root node.

In one implementation of the invention, the method further includes before the step of receiving a request to restore the primary tree:
  a step of detecting that the fault is over; and
  a step of sending the primary root node information relating to the primary tree.

This makes it possible for the primary root node to obtain the parameters of the primary tree if necessary in order to set up again identically the branch of the primary tree downstream of the merge node.

The invention also provides a method of restoring in a connected mode communications network a point-to-multipoint primary tree set up from a primary root node to leaf nodes, said method including the following steps executed by said primary root node:
  a step of receiving from one of the downstream merge nodes a notification indicating that protection of the primary tree in the event of a fault affecting the primary root node is provided by a back-up tree connected to the primary tree at said merge node;
  a step of detecting that a fault affecting it is over; and
  a step of sending said merge node a restore request relating to the primary tree.

The primary root node is informed by the merge node or nodes of the configuration of the protection. When it is detected that the fault is over, it is preferable to set up again identically the branch or branches of the primary tree connecting it to the merge node or nodes. The primary tree is therefore set up again and active in the same manner as before the fault.

The primary root node may store information relating to the primary tree necessary for setting it up again.

It may alternatively receive this information from the merge node when said point detects that the fault is over.

The invention further provides a protector node in a connected mode communications network, said node contributing to protecting a point-to-multipoint primary tree set-up from a primary root node to leaf nodes in the event of a fault affecting the primary root node by means of a back-up tree between a back-up root node and at least one protector node belonging to a branch of the primary tree coming from the primary root node and including:
  means for receiving a request to set up the back-up tree sent by the back-up root node and containing an identifier of the protected primary root node; and
  means for configuring a routing rule in a table, the aim of said rule being to route packets coming from the back-up tree to branches of the primary tree coming from said protector node only in the event of a fault affecting the primary root node.

The invention further provides a root node in a connected mode communications network, said node being the root of a point-to-multipoint primary tree set up to leaf nodes and being adapted to restore the primary tree after a fault affecting it is over, said node including:

means for receiving from one of the downstream merge nodes a notification indicating that protection of the primary tree in the event of a fault affecting the root node is provided by a back-up tree connected to the primary tree at said merge node;

means for detecting that a fault affecting it is over; and means for sending said merge node a restore request relating to the primary tree.

The invention further provides a communications system in a connected mode communications network, including:

at least one root node, said node being the root of a point-to-multipoint primary tree set up to leaf nodes;

at least one protector node as described above; and a back-up root node including sending means adapted to send a request to set up the back-up tree to a protector node, the set-up request containing an identifier of the protected primary root node, and receiver means adapted to receive from a protector node a notification containing information relating to the configuration of the protection by that other node.

The invention further provides a signal sent by a node of a connected mode communications network to another node of the network and bearing a request to set up between said node and said other node a branch belonging to a back-up tree, said set-up request including:

a request for protection by said back-up tree of a point-to-multipoint primary tree set up from a primary root node to leaf nodes in the event of a fault affecting the primary root node, said other node belonging to a branch of the primary tree coming from the primary root node; and an identifier of the primary root node.

The invention further provides a signal sent by a node of a connected mode communications network to another node of the network and bearing a message belonging to the group comprising at least one response to a request to set up a back-up tree between said node and said other node in order for said back-up tree to protect a point-to-multipoint primary tree already set up from a primary root node to leaf nodes in the event of a fault affecting the primary root node and a message for retaining the primary tree already set up, said node belonging to a branch of the primary tree coming from the primary root node and said message including information belonging to the group comprising information relating to configuration of the protection and information relating to activation of the protection.

The invention further provides a computer program including instructions for execution of the protection method as described above by a node of a connected mode communications network when said program is executed by a processor.

BRIEF DESCRIPTION OF THE DRAWINGS

The invention can be better understood with the aid of the following description of the method of one particular implementation of the invention given with reference to the appended drawings, in which:

FIG. 1 represents diagrammatically a communications network in which the method of the invention is used;

FIG. 2 represents a device of one particular implementation of the invention;

FIG. 4a represents a message requesting setting up of a back-up tree used in one particular implementation of the invention; and FIG. 4b represents a response message to a set-up request or a message to retain the primary tree set up used in one particular implementation of the invention.

DETAILED DESCRIPTION

Figure 3:
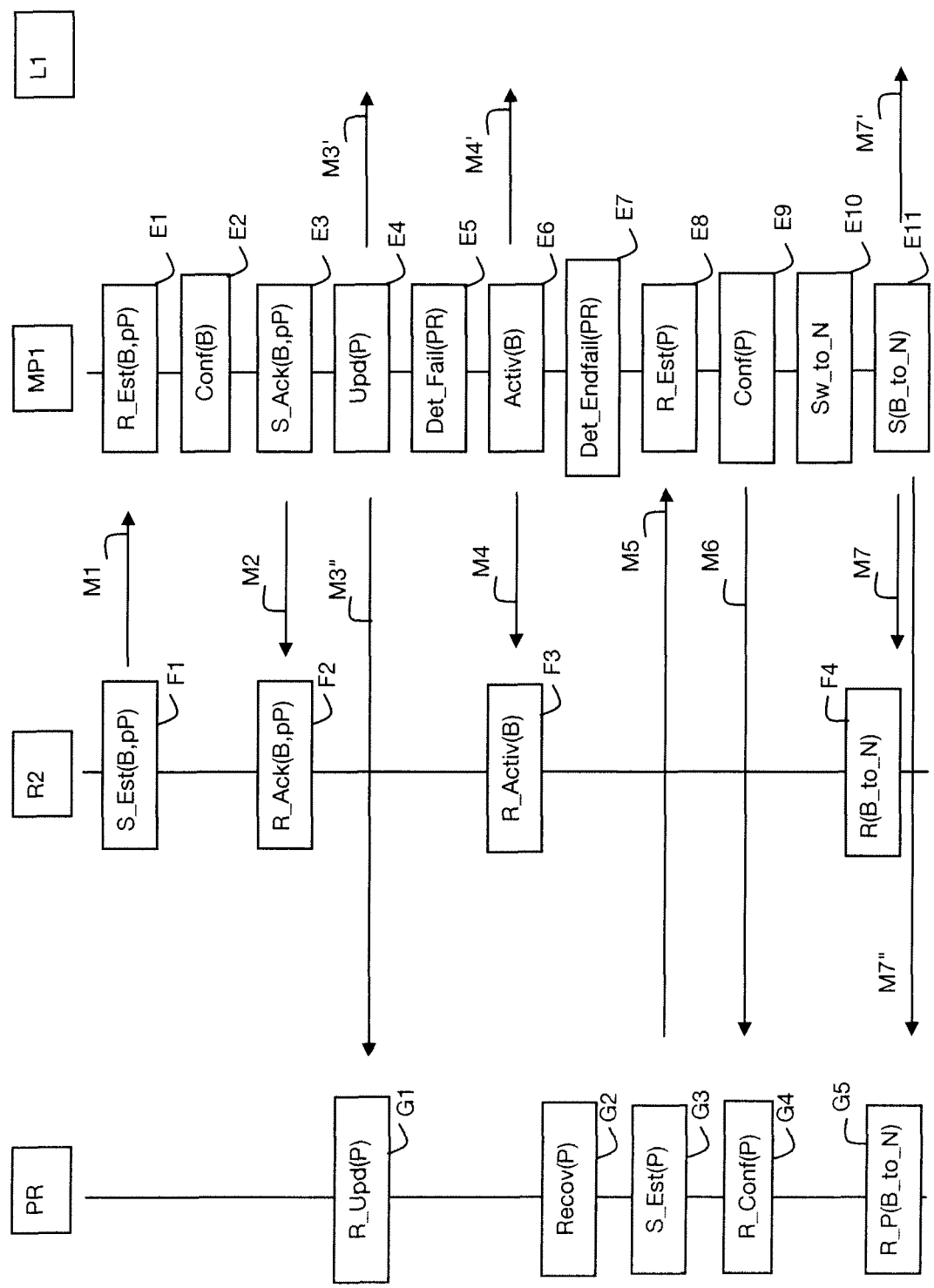
FIG. 3 represents the steps of the protection and restore methods of one particular implementation of the invention.

FIG. 1 shows diagrammatically a communications network including a plurality of routing nodes PR, R1 to R4, MP1 and MP2. A multicast source S sends traffic on two multicast channels C1 and C2. The network also includes two leaf nodes L1 and L2 to which receivers T1 to T4 are connected. The receivers T1 and T2 are connected to the leaf node L1 and receive multicast channels C1 and C2, respectively. The receivers T3 and T4 are connected to the leaf node L2 and receive multicast channels C1 and C2, respectively. A connected mode point-to-multipoint primary tree LSP1 is set up between the node PR and the leaf nodes L1 and L2 using mechanisms defined in the IETF document RFC 4875. The node PR is referred to below as the primary root node of the primary tree. This primary tree comprises two branches coming from the primary root node: a first branch that connects it to the node MP1 and a second branch that connects it to the node MP2. The primary tree then includes a branch going from the node MP1 to the leaf node L1 and another branch going from the node MP2 to the leaf node L2. The two channels C1 and C2 are broadcast to the primary root PR. The packets on these two channels are routed by the primary tree LSP1 set up in this way and reach the two leaf nodes L1 and L2. The leaf nodes L1 and L2 comprise means enabling them to tell whether traffic received from the primary tree LSP1 belongs to the channel C1 or the channel C2. These means are based on extensions of the Border Gateway Protocol (BGP) defined in RFC 4364 and the IETF document entitled Multicast in MPLS/BGP VPNs. They may equally be based on IP multicast mechanisms.

In the particular example of FIG. 1, a connected mode point-to-multipoint back-up tree LSP2 is configured between the node R2 and the leaf nodes L1 and L2. The node R2 is referred to below as the back-up root node of the back-up tree. This back-up tree comprises two branches coming from the back-up root node: a first branch that connects it to the node MP1 via the routing node R3 and a second branch that connects it to the node MP2 via the routing node R4. The routing nodes MP1 and MP2 are referred below as merge nodes; they make it possible to connect the back-up tree to the primary tree. These merge nodes MP1 and MP2 are downstream nodes on branches coming from the primary root node. They are preferably situated at the respective ends of the branches coming from the primary root node PR to enable fast detection of a fault affecting the primary root node PR. The two channels C1 and C2 are also broadcast to the back-up root R2. The method of setting up the back-up tree is described in detail below during the description of the steps of the protection method. Note that depending on the structure of the primary tree, the back-up tree may also be a point-to-point path; this is so if there is only one merge node. Below, the term back-up tree refers to point-to-multipoint trees when there is a plurality of merge nodes and otherwise to point-to-point paths. Of course, the network also includes other routing nodes that are not represented in FIG. 1. Only the nodes active during tree set-up are represented. It should further be noted that the methods described are not restricted to protecting a primary tree of the kind represented in FIG. 1, which has a very simple tree structure.

FIG. 4a represents a back-up tree set-up request message 100. In the RSVP-TE protocol, for example, this is a Path message.

The message 100 includes a field 102 including a message type and parameters 104 necessary for setting up the back-up tree.

According to the invention, it further includes:
an identifier 106 of the primary root node, for example its address in the IP network; and
parameters 108 of the primary tree, notably a point-to-multipoint indicator, an identifier of the tunnel, and a primary tree identifier.

Thus the back-up tree set-up request includes a request for protection by said back-up tree of a point-to-multipoint primary tree set up from a primary root node to the leaf nodes in the event of a fault affecting the primary root node.

In the RSVP-TE protocol, for example, the identifier 106 of the primary root node and the parameters 108 of the primary tree may be transported in a new RSVP-TE object Root_Protection.

FIG. 4b represents a message 200, which may be a response to the back-up tree set-up request 100, a notification message or a message to retain the primary tree already set up. In the RSVP-TE protocol, for example, this is a Path or Resv message.

Such a message 200 further includes a field 202 including a message type and, depending on that message type, the objects specified in IETF document RFC 4875:
information 204 relating to the configuration of the protection, protected or not; and
information 206 relating to the activation of the protection, activated or not.

For example, it is possible to provide two new attributes in the object RSVP-TE LSP_ATTRIBUTE, as specified in IETF document RFC 4420 entitled Encoding of Attributes for MPLS Label Switched Path (LSP) Establishment Using RSVP-TE.

The method used in a connected mode communications network to protect a point-to-multipoint primary tree set up from a primary root node to leaf nodes in the event of a fault affecting the primary root node and the restore method are described below with reference to FIG. 3.

In an initial state the point-to-multipoint primary tree LSP1 is already set up between the primary root node PR and the leaf nodes L1 and L2 via merge nodes MP1 and MP2. Thus each merge node stores in an MPLS routing table 302 a routing rule referred to below as the nominal routing rule, for the aim of routing packets received from a branch of the primary tree to the branch or branches of the primary tree coming from the merge node concerned. To be more precise, packets received from a branch of the upstream primary tree with a label assigned to that branch of the primary tree are sent to one or more other downstream branches of the primary tree with a respective label assigned to the or each other branch. Considering in particular the merge node MP1 in FIG. 1, packets received from the primary root node PR on the primary tree LSP1 are routed to the branch of the primary tree connecting the merge node MP1 to the leaf node L1.

In one particular implementation of the invention, an operator configures the back-up tree in the back-up root node R2, indicating that it is a back-up tree for protecting a root node.

The operator also configures the following parameters:
the address in the IP network of the primary root node PR to be protected;
parameters of the primary tree, i.e. a point-to-multipoint indicator, a tunnel identifier, and a primary tree identifier;
a list of the addresses in the IP network of the merge nodes MP;
the parameters relating to the reservation of resources of the primary tree, bandwidth, priorities, class of service;
a list of protected multicast channels; and
the explicit path of the back-up tree.

Below the back-up tree is labeled LSP2.

In a first step F1 of sending a set-up request, labeled S_Est (B,pP) in FIG. 3, the back-up root node R2 sends one of the merge nodes MP a message M1 requesting setting up 100 of the back-up tree LSP2 including a request for protection of the point-to-multipoint primary tree LSP1 in the event of a fault affecting the primary root node PR, an identifier 106 of the primary root node PR, and an identifier 108 of the primary tree, as shown in FIG. 4a. This message is for example an RSVP-TE Path message. Note that the back-up tree set-up request deactivates the Penultimate Hop Popping (PHP) function on the stand-by tree in order to enable identification at the merge node of packets received in the back-up tree.

In this particular implementation of the invention, the back-up tree set-up request message M1 includes the identifier 108 of the primary tree in addition to the identifier of the back-up tree. This means that there can be two different identifiers distinguishing the back-up tree from the primary tree. It is thus easier for an operator to distinguish a fault on a link or at a node of the back-up tree from a fault on a link or at a node of the primary tree.

The following description applies to one of the merge nodes, for example the merge node MP1. The merge node is the protector node. Note that messages exchanged between the back-up root node R2 and the merge node MP1 pass in transit through the routing node R3, but this is not referred to again below in order to simplify the description.

In a protection method step E1 of receiving a set-up request, labeled R_Est(B,pP), the merge node MP1 receives the message M1.

In a protection method step E2 of configuring a routing rule, labeled Conf(B) in FIG. 3, the merge node MP1 sets up the back-up tree LSP2 according to the set-up request and then configures another routing rule, referred to below as the back-up routing rule, in the MPLS routing table. The aim if the back-up routing rule is to route packets coming from a branch of the back-up tree LSP2 determined by the identifier of the back-up tree to the branch or branches of the primary tree determined by the identifier 108 of the primary tree coming from the merge node MP1. In the particular situation shown in FIG. 1, this means routing packets received on the branch of the back-up tree coming from the node R3 to the branch of the primary tree LSP1 connecting the merge node MP1 to the leaf node L1. This back-up routing rule is configured as a back-up exit in the event of a fault affecting the primary root node PR. However, the back-up routing rule is not active, i.e. packets received from the back-up tree are ignored by the merge node.

In a protection method step E3 of responding to the set-up request, labeled S_Ack(B,pP) in FIG. 3, the merge node MP1 sends the back-up root node R2 a message M2 confirming setting up of the back-up tree 200 including an indication 204 that the requested protection has been configured and an indication 206 that the protection is not active, as shown in FIG. 4b. The message is an RSVP-TE Resv message, for example.

In a protection method step F2 of receiving of a response, labeled R_Ack(B,pP) in FIG. 3, the back-up root node R2 receives the message M2.

Thus the back-up root node R2 is informed not only of the setting up of the branch of the back-up tree connecting it to the merge node MP1 but also that the routing table has been configured.

In a protection method step E4 of notification following the step E3, labeled UPd(P) in FIG. 3, the merge node MP1 sends a first message M3' in the downstream direction, i.e. on the branch or branches of the primary tree coming from the merge node, and a second message M3" in the upstream direction, i.e. toward the primary root node. As shown in FIG. 4b, these messages M3' and M3" relate to the primary tree LSP1 and include an indication 204 that protection of the primary route node has been configured and an indication 206 that the protection is not active. For example, the downstream message is an RSVP-TE message (Path) and the upstream message is RSVP state refresh for example a RSVP-TE update message Resv.

In a restore method step G1 of reception, labeled R_Upd(P) in FIG. 3, the primary root node PR receives from the merge node MP1 the message M3" informing it that protection in the event of a fault affecting the primary root node of the primary tree has been configured.

The step G1 may also be implemented in the protection method and enables a network operator to supervise more easily the protection configured in the network.

These steps E1 to E3, F1 and F2 of the protection method and the restore method step G1 of reception are repeated for the various merge nodes if necessary.

Following the reception step or steps G1, and thus following reception of one or more message M3" from the merge node or nodes, the primary root node PR saves in a non-volatile memory area the identifiers of the primary tree, i.e. a point-to-multipoint indicator, an identifier of the tunnel, an identifier of the primary tree, and the explicit path of the primary tree, in order to be able to restore the primary tree identically after a fault in the primary root node itself.

In the packet transfer plane, in nominal mode, packets received from the broadcast source by the primary and back-up root nodes are routed in the primary and back-up trees, respectively. The merge nodes MP1 and MP2 receive the packets twice but do not reroute the received packets to the back-up tree. Thus only one copy of the packets sent by the broadcast source reaches the leaf nodes.

The above steps relate to a phase of configuration and operation in nominal mode.

A second phase described below switches from the nominal mode to the back-up mode.

In a protection method step E5 of fault detection, labeled Det_fail(PR) in FIG. 3, the merge node MP1 detects a fault affecting the primary root node PR. This may be a fault in the primary root node itself or a fault on the link on which the branch of the primary tree connecting the primary root node PR to the merge node MP1 was set up. The merge node detects the fault in the primary root node PR by a level 2 alarm or using the Bidirectional Forwarding Detection (BFD) protocol specified in the IETF document draft-ietf-bfd-base-07.txt.

In a protection method step E6 of back-up routing rule activation, labeled Activ(B) in FIG. 3, the merge node MP1 deactivates the nominal exit, i.e. the nominal routing rule, and activates the back-up exit, i.e. the back-up routing rule that was configured in the step E2. A fault affecting the primary root node PR is detected quickly by a merge node MP1 because it is a direct neighbor of the primary root node. For example, for a Synchronous Digital Hierarchy (SDH) interface, detection takes less than five milliseconds.

In the transfer plane, in back-up mode, packets received by the merge node MP1 on the back-up tree are routed to the branch or branches of the primary tree coming from the merge node. This ensures continuity of the primary tree LSP1. Any packets received by the merge node MP1 on the primary tree are ignored. Thus only one copy of packets sent by the broadcast source reaches the leaf nodes. The time necessary for rerouting the packets is compatible with the required security level.

Then, still in this step E6 of activating the back-up routing rule, the merge node MP1 sends notification messages M4 and M4' respectively in the upstream direction, i.e. to the back-up root node R2, and in the downstream direction, i.e. on the branch or branches of the primary tree coming from the merge node. As shown in FIG. 4b, these notification messages M4 and M4' include an indication 206 that protection of the primary tree by the back-up tree has been activated. This is for example an RSVP-TE Resv message for updating the upstream back-up tree LSP2 and an RSVP-TE Path message for updating the downstream primary tree LSP1. Moreover, the message M4' is sent regularly in order to retain the downstream primary tree already set up. This prevents expiry of the RSVP states of the downstream primary tree LSP1, which would lead to elimination of the primary tree LSP1.

The message M4 is received by the back-up root node R2 in a protection method step F3 of reception, labeled R_Activ (B) in FIG. 3.

In a third phase for returning to the nominal mode, the nodes execute the following steps.

In a restore method step G2 of parameter recovery, labeled Recov(P) in FIG. 3, the primary root node PR detects that a fault that had affected it is over. If the fault is a fault in the primary root node itself, it recovers the parameters of the primary tree LSP1 that it backed up in a non-volatile memory area. These parameters are the parameters of the primary tree LSP1 necessary for restoring its portion upstream of the merge nodes.

In a restore method step G3 of message sending, labeled S_Est(P), it then sends the merge nodes messages M5 requesting setting up of the primary tree LSP1. For example, these messages M5 are RSVP-TE Path messages. They make it possible to restore identically branches of the primary tree upstream of the merge nodes.

In a protection method step E7 of end of fault, labeled Det_Endfail(PR) in FIG. 3, the merge node MP1 has detected the end of the fault.

It receives the message M5 in a protection method receiving step E8, labeled R_Est(P) in FIG. 3.

In a protection method step E9 of configuration, labeled Conf(P) in FIG. 3, it then configures the nominal routing rule in its MPLS routing table, but does not activate it, and then sends a set-up confirmation message M6. These messages are RSVP-TE Resv messages, for example. The merge node MP1 then triggers a time-out T.

In a restore method step G4 of message reception, labeled R_Conf(P) in FIG. 3, the primary root node PR receives the message M6 confirming setting up of the primary tree. The primary root node PR then sends the packets received from the broadcast source to the primary tree.

On expiry of the time-out T, in a protection method step E10 of return to nominal mode, labeled Sw_to_N in FIG. 3, the merge node MP1 deactivates the back-up routing rule in its routing table and activates the nominal routing rule. The back-up routing rule is configured again as the back-up exit in the event of a fault affecting the primary root node PR. Then, in a protection method step E11 of notification, labeled S(B_to_N) in FIG. 3, the merge node MP1 sends:

the primary root node PR a message M7" for updating the primary tree indicating that the protection of the primary root node has been configured but not activated; this is an RSVP-TE Resv message, for example;

the back-up root node R2 a message M7 for updating the back-up tree indicating that the protection of the primary root node has been configured but not activated; this is an RSVP-TE Resv message, for example; and the branch or branches of the downstream primary tree a primary tree updating message M7' indicating that the protection of the primary root node has been configured but not activated; this message is an RSVP-TE Path message, for example.

The message M7 is received by the back-up root node R2 in a protection method receiving step F4, labeled R(B_to_N) in FIG. 3.

The message M7 is received by the primary root node PR in a restore method step G5 of reception, labeled R_P(B_to_N) in FIG. 3.

The operating mode thus reverts to the nominal mode set up at the end of the first phase, the primary tree being protected by the back-up tree in the event of a fault affecting the primary root node. Thus it is possible to revert to this nominal operating mode without impacting on the reception of packets by the receivers. The method of restoring the primary tree does not impose any exchange of messages between the primary root node and the back-up root node and avoids any problems of synchronization between the two root nodes.

In the transfer plane, before expiry of the time-out T, packets received by the merge node MP1 on the back-up tree are routed to the branch or branches of the primary tree coming from the merge node. Any packets received by the merge node MP1 on the primary tree are ignored. After expiry of the time-out T, packets received by the merge node MP1 on the back-up tree are ignored. Packets received by the merge node MP1 on the primary tree are routed to the branch or branches of the primary tree coming from the merge node. Thus only one copy of packets sent by the broadcast source reaches the leaf nodes during this phase of returning to the nominal mode.

As an alternative to implementing the time-out T, it is possible for a notification to be sent from the primary root node to the merge node or nodes informing them that the transfer of packets from the primary root node on the primary tree has resumed.

This implementation of the invention is described above with an identifier 108 of the primary tree inserted into the back-up tree set-up request; this makes it possible to use a different value for the identifier of the back-up tree. In a variant of this implementation, the request to set up the back-up tree M1 does not explicitly contain an identifier 108 of the primary tree. In this situation the identifier of the primary tree to be protected is indicated implicitly by the identifier of the back-up tree. Thus the same identifier is used for the back-up tree and the primary tree.

In another implementation, after the configuration phase, the primary root node PR does not back-up the parameters of the primary tree. In this situation, following detection that the fault is over in the step F7, the merge node MP1 sends the primary root node PR in a notification message all the parameters of the primary tree sent by the primary root node PR during setting up of the primary tree. For example, the message is an RSVP-TE Recovery Path message defined in the IETF document RFC 5063 entitled Extensions to GMPLS Resource Reservation Protocol (RSVP) Graceful Restart. This message is received by the primary root node PR during the recovery step G2. The other steps of the methods are unchanged.

In a first variant of these two implementations, the operator does not configure the explicit path from the back-up tree to the merge nodes. In this situation, the back-up root node R2 must determine it beforehand during the step F1. The back-up path to a given merge node MP must avoid the primary root node PR and all links that belong to at least one Shared Risk Link Group (SRLG) of the link between the primary root node PR and the given merge node.

In a second variant of these implementations of the invention, the operator does not configure the back-up tree. In this situation, the primary root node PR effects the following operations:

it determines the multicast channels to be protected; there may be a list of configured channels or the default option is to protect all the transported channels;

it determines a back-up root node R2, either statically, by configuration at the primary root node PR, or dynamically, by analyzing BGP information announcing the multicast channels; a node may be eligible as back-up root node if the multicast channels that it announces include the channels to be protected; if there is a plurality of nodes eligible as back-up root node, the primary root node PR determines one of them, for example the nearest one, using a local policy;

when the back-up root node has been determined, the primary root node may optionally calculate a back-up point-to-multipoint tree from the back-up root node to all the merge nodes MP; a path of a back-up tree between the back-up root node and a given merge node MP must avoid the primary root node PR and all links of at least one Shared Risk Link Group (SRLG) of the link between the primary root node PR and the given merge node; the back-up tree may equally be configured statically at the primary root node PR or determined by the back-up root node; coordinated calculation of the primary and back-up trees by the primary root node PR makes it possible to offer better optimization of resources; and the primary root node sends a notification message, for example a Notify message, to the back-up root node R2 with the following parameters: the address of the primary root node PR, an identifier of the primary tree, a list of merge nodes MP, parameters relating to TE resource reservation, a list of channels to be protected, and, optionally, the explicit back-up P2MP path indicating to the back-up root node that it must activate a back-up tree.

In this second variant, after the step F2 of receiving a response, and when it has received responses from all the merge nodes, the back-up root node R2 sends the primary root node confirmation of activation of the back-up tree and protection.

Note that in the implementations described and their variants, the back-root node R2 sends in the transfer plane all packets received from the broadcast source S and has no role in the activation of protection. For their part, the merge node or nodes are active in the activation of protection. These roles are therefore different from those specified in the prior art document draft-cao-mpls-to-p2mp-head-protection-01.txt and contribute to addressing the stated requirement.

It is possible to combine the protection method defined above and fast reroute protection of the link between the primary root node PR and the merge node MP1 specified in the IETF document P2MP Fast Reroute, draft-ietf-mpls-p2mp-te-bypass-01. This requires at the merge node MP1 a mechanism for distinguishing a link fault from a node fault, for example in the manner defined in the IETF document Distinguish a link from a node failure using RSVP Hellos extensions, draft-vasseur-mpls-linknode-failure. This makes it possible to switch to the back-up tree only in the event of a fault in the primary root node PR itself and to retain the advantages of fast reroute mechanisms in the event of a fault on a link of the primary tree coming from the primary root node PR.

FIG. 2 represents a communications network node 300. The node includes:

a routing table 302, labeled Table in FIG. 2, adapted to store active and non-active routing rules;

packet routing means 304, labeled R_P in FIG. 2, adapted to route packets as a function of routing rules stored in the routing table 302;

a module 306, labeled Se in FIG. 2, for sending in the control plane messages conforming to a given protocol;

a module 308, labeled Re in FIG. 2, for receiving in the control plane messages conforming to the given protocol; and a fault start and end detection module 310, labeled Det in FIG. 2, adapted to detect a fault affecting a given node.

In the particular implementation described, the modules 306 and 308 use the RSVP-TE protocol conforming to RFC 4875.

A node of the communications network serving as a protector node in the event of a fault affecting a primary root node of a point-to-multipoint primary tree is noteworthy in that:

the receiver module 308 is adapted to receive a back-up tree set-up request sent by the back-up root node containing an identifier of the protected primary root node and an identifier of a protected primary tree; and it includes a module 312, labeled Conf_R in FIG. 2, for configuring a routing rule in the routing table, the aim of this rule being to route packets from the back-up tree to branches of the primary tree coming from the protector node only in the event of a fault affecting the primary root node.

It further includes a rule activation module 314, labeled Activ in FIG. 2, adapted to activate a back-up routing rule and to deactivate a nominal routing rule as a function of a fault detected by the fault detector module 310. The module 314 is further adapted to activate the nominal routing rule and to deactivate the back-up routing rule following a request to restore the primary tree.

The sending module 306 is further adapted to send other nodes notifications containing information relating to configuration of the protection and information relating to activation of the protection.

A node of the communications network serving as back-up root node in the event of a fault affecting a primary root node of a point-to-multipoint primary tree is noteworthy in that:

the sending module 306 is adapted to send another node a request to set up the back-up tree, the back-up tree set-up request including an identifier of the protected primary root node and an identifier of a protected primary tree; and the receiving module 308 is further adapted to receive from another node notifications containing information relating to configuration of the protection by that other node and information relating to activation of the protection.

A node of the communications network serving as primary root node, belonging to a point-to-multipoint primary tree protected by a back-up tree connected to the primary tree, in the event of a fault affecting it, adapted to restore the primary tree after the fault is over, is noteworthy in that:

the receiving module 308 is further adapted to receive from another node notifications containing information relating to configuration of the protection by that other node and information relating to activation of the protection; and the sending module 306 is further adapted to send another restore request relating to the primary tree, following detection by the fault detection module 310 that the fault is over.

The modules 306, 308, 312, 314 of the protector node are adapted to execute the protection method described above. They are preferably software modules including software instructions for executing the steps of the protection method described above when they are executed by a node of the communications network. The invention therefore further provides:

a program for use in a node of a communications network, containing program instructions adapted to command execution of those of the steps of the protection method described above that are executed by said node when it executes said program; and a storage medium readable by a node of a communications network for storing the program for use in a communications network node.

The modules 306, 308 of the primary root node are adapted to execute the restore method described above. They are preferably software modules comprising software instructions for having executed those of the steps of the restore method described above that are executed by a node of the communications network. The invention therefore also provides:

a program for use in a communications network node, containing program instructions adapted to command the execution of those of the steps of the restore method described above that are executed by said node when it executes said program; and a storage medium readable by a node of a communications network for storing the program for use in a communications network node.

The software modules may be stored in and sent by a data medium. This may be a hardware storage medium, for example a CD-ROM, a magnetic diskette or a hard disk, or a transmission medium such as an electrical, optical or radio signal, or a telecommunications network.

The invention therefore also provides a communications system in a connected mode communications network, the system including:

at least one primary root node PR that is the root of a point-to-multipoint primary tree set up to leaf nodes;

at least one protector node MP1 contributing to protecting the primary tree in the event of a fault affecting the primary root node by means of a back-up tree between a back-up root node and the protector node, the protector node belonging to a branch of the primary tree coming from the primary root node, as described above; and a back-up root node R2 as described above.

In one implementation, the primary root node of the communications system described above is a primary root node adapted to restore the primary tree when the fault is over, as described above.

It should be noted that the description has been given in the particular situation of an MPLS communications network supporting the RSVP-TE protocol. However, the method described may be used in communications networks of other types, provided that it is possible to set up therein connections with reservation of resources. This means connected mode packet transport networks. For example, an asynchronous transfer mode (ATM) communications network supporting the Asynchronous Transfer Mode Private Network-to-Network Interface (ATM-PNNI) signaling protocol, makes it possible to establish such connections. Thus a message requesting setting up of a point-to-multipoint tree with resource reservation corresponds to a set-up message and a set-up confirmation message corresponds to a connect message, for example.

The invention claimed is:

1. A method of protecting a point-to-multipoint primary tree in a connected mode communications network set up from a primary root node to leaf nodes in an event of a fault affecting the primary root node by way of a back-up tree between a back-up root node and at least one merge node downstream from the back-up root node, said at least one merge node belonging to a branch of the primary tree downstream from the primary root node, said method including the following steps executed by said at least one merge node:
   receiving a request to set up the back-up tree sent by the back-up root node; and
   configuring a routing rule in a table, which is used to route packets coming from the back-up tree to branches of the primary tree downstream from said merge node;
   wherein the set-up request comprises an identifier of the protected primary root node and said routing rule is activated only in the event of a fault affecting the identified primary root node; and
   wherein packets are received by said at least one merge node from both the primary tree and the back-up tree, before the routing rule is activated.

2. The protection method according to claim 1, wherein the set-up request comprises an identifier of the protected primary tree different from an identifier of the back-up tree.

3. The protection method according to claim 1, further comprising a step of sending the primary root node a notification indicating that protection of the primary tree in the event of a fault affecting the root node is configured.

4. The protection method according to claim 1, further comprising steps of:
   detecting a fault affecting the primary root node; and
   activating said routing rule.

5. The protection method according to claim 4, further comprising a step of notifying the back-up root node of activation of the protection.

6. The protection method according to claim 4, further comprising a step of retaining the primary tree already set up for each branch of the primary tree coming from the merge node.

7. The protection method according to claim 4, further comprising steps of:
   receiving from the primary root node a restore request relating to the primary tree; and
   activating another routing rule, which is used to route packets received on the primary tree to the branches of the primary tree coming from said merge node.

8. The protection method according to claim 7, wherein the method further comprises before the step of receiving a request to restore the primary tree steps of:
   detecting that the fault is over; and
   sending the primary root node information relating to the primary tree.

9. A method of restoring in a connected mode communications network a point-to-multipoint primary tree set up from a primary root node to leaf nodes, said method comprising the following steps executed by said primary root node:
   receiving from one or more downstream merge nodes, said merge nodes implementing the protecting method according to claim 1, a notification indicating that protection of the primary tree in the event of a fault affecting the primary root node is provided by a back-up tree connected to the primary tree at said merge node;
   detecting that a fault affecting the primary root tree is over; and
   sending one or more downstream merge nodes a restore request relating to the primary tree.

10. A merge node (MP1, MP2, 300) in a connected mode communications network, said node contributing to protecting a point-to-multipoint primary tree set-up from a primary root node to leaf nodes in an event of a fault affecting the primary root node by way of a back-up tree between a back-up root node and at least one merge node belonging to a branch of the primary tree coming from the primary root node and comprising:
   a receiving module for receiving a request to set up the back-up tree sent by the back-up root node and containing an identifier of the protected primary root node; and
   a configuration routine for configuring a routing rule in a table which is used to route packets coming from the back-up tree to branches of the primary tree coming from said merge node only in the event of a fault affecting the primary root node;
   wherein packets are received by said merge node from both the primary tree and the back-up tree, before the routing rule is activated.

11. A communications system in a connected mode communications network, comprising:
   at least one root node, said node being the root of a point-to-multipoint primary tree set up to leaf nodes;
   at least one merge node according to claim 10; and
   a back-up root node comprising a sending module for sending a request to set up the back-up tree to a merge node, the set-up request containing an identifier of the protected primary root node, and receiver for receiving from a merge node a notification containing information relating to the configuration of the protection by merge node.

12. An article of manufacture including computer readable media with instructions encoded and stored thereon, the stored instructions, when executed causes the computer to perform the steps of:
   receiving a request to set up the back-up tree sent by the back-up root node; and
   configuring a routing rule in a table, which is used to route packets coming from the back-up tree to branches of the primary tree coming from said merge node;
   wherein the set-up request comprises an identifier of the protected primary root node and said routing rule is activated only in an event of a fault affecting the identified primary root node;
   wherein packets are received by said merge node from both the primary tree and the back-up tree, before the routing rule is activated.

* * * * *